(12) United States Patent
Zhu et al.

(10) Patent No.: US 11,530,461 B2
(45) Date of Patent: *Dec. 20, 2022

(54) COLD ROLLED AND ANNEALED STEEL SHEET AND METHOD OF MANUFACTURING THE SAME

(71) Applicant: ArcelorMittal, Luxembourg (LU)

(72) Inventors: Kangying Zhu, Metz (FR); Astrid Perlade, Le Ban-Saint-Martin (FR); Coralie Jung, Metz (FR); Frederic Kegel, Yutz (FR)

(73) Assignee: ArcelorMittal, Luxembourg (LU)

( * ) Notice: Subject to any disclaimer, the term of this patent is extended or adjusted under 35 U.S.C. 154(b) by 131 days.

This patent is subject to a terminal disclaimer.

(21) Appl. No.: 16/766,328

(22) PCT Filed: Nov. 21, 2018

(86) PCT No.: PCT/IB2018/059162
§ 371 (c)(1),
(2) Date: May 22, 2020

(87) PCT Pub. No.: WO2019/111084
PCT Pub. Date: Jun. 13, 2019

(65) Prior Publication Data
US 2020/0370141 A1    Nov. 26, 2020

(30) Foreign Application Priority Data

Dec. 5, 2017    (WO) .................. PCT/IB2017/001520

(51) Int. Cl.
*C21D 1/18* (2006.01)
*C21D 6/00* (2006.01)
(Continued)

(52) U.S. Cl.
CPC ................ *C21D 9/46* (2013.01); *B23K 11/11* (2013.01); *B23K 11/115* (2013.01); *B23K 11/16* (2013.01); *B23K 11/163* (2013.01); *B23K 11/166* (2013.01); *B32B 15/012* (2013.01); *B32B 15/013* (2013.01); *B32B 15/04* (2013.01); *B32B 15/043* (2013.01); *B32B 15/18* (2013.01); *C21D 1/18* (2013.01); *C21D 1/25* (2013.01); *C21D 1/26* (2013.01); *C21D 1/34* (2013.01); *C21D 6/00* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0273* (2013.01); *C21D 8/0436* (2013.01); *C21D 8/0447* (2013.01); *C21D 8/0473* (2013.01); *C21D 9/48* (2013.01); *C22C 38/001* (2013.01); *C22C 38/002* (2013.01); *C22C 38/02* (2013.01); *C22C 38/04* (2013.01); *C22C 38/06* (2013.01);
(Continued)

(58) Field of Classification Search
CPC ........ C21D 2211/001; C21D 2211/004; C21D 2211/008; C21D 9/46; C21D 9/48; C21D 8/0205; C21D 8/0226; C21D 8/0236; C21D 8/0273; C21D 8/0436; C21D 8/0447; C21D 8/0473; C21D 1/18; C21D 1/25; C21D 1/26; C21D 1/34; C21D 6/005; C21D 6/008; C21D 6/00; C21D 6/02; B23K 11/11; B23K 11/16; B23K 11/115; B23K 11/163; B23K 11/166; B23K 2101/006; B32B 15/012; B32B 15/013; B32B 15/04; B32B 15/043; B32B 15/18; C22C 38/001; C22C 38/002; C22C 38/02; C22C 38/04; C22C 38/06; C22C 38/12; C22C 38/14; C22C 38/16; C22C 38/22; C22C 38/24; C22C 38/26; C22C 38/28; C22C 38/32; C22C 38/34; C22C 38/38; C22C 38/18; C23C 2/12; C23C 2/06; C23C 2/26; C23C 2/40; C23C 30/00; C23C 30/005; Y10T 428/12757; Y10T 428/12799; Y10T 428/12972
See application file for complete search history.

(56) References Cited

U.S. PATENT DOCUMENTS 9,435,013 B2    9/2016    Hata et al.
10,858,717 B2    12/2020    Tsuzumi et al.
(Continued)

FOREIGN PATENT DOCUMENTS

CN    105408513 A    3/2016
CN    107002155 A    8/2017
(Continued)

OTHER PUBLICATIONS

International Search Report of PCT/IB2018/059162, dated Jan. 30, 2019.

*Primary Examiner* — Michael E. La Villa
(74) *Attorney, Agent, or Firm* — Davidson, Davidson & Kappel, LLC

(57) ABSTRACT

A cold-rolled and heat-treated steel sheet having a microstructure consisting of, in surface fraction: between 10% and 30% of retained austenite, the retained austenite being present as films having an aspect ratio of at least 3 and as Martensite Austenite islands, less than 8% of the Martensite Austenite islands having a size above 0.5 µm, at most 1% of fresh martensite, at most 50% of tempered martensite, and recovered martensite containing precipitates of at least one element chosen among niobium, titanium and vanadium. A method for manufacturing the cold-rolled and heat-treated steel sheet is also described.

19 Claims, No Drawings

(51) Int. Cl.
*C21D 8/02* (2006.01)
*C21D 9/46* (2006.01)
*B23K 11/11* (2006.01)
*B23K 11/16* (2006.01)
*B32B 15/01* (2006.01)
*C22C 38/12* (2006.01)
*C22C 38/06* (2006.01)
*C22C 38/04* (2006.01)
*C22C 38/02* (2006.01)
*C22C 38/00* (2006.01)
*C21D 1/25* (2006.01)
*C21D 9/48* (2006.01)
*C22C 38/14* (2006.01)
*C22C 38/16* (2006.01)
*C23C 2/12* (2006.01)
*C21D 8/04* (2006.01)
*C22C 38/38* (2006.01)
*C22C 38/22* (2006.01)
*C22C 38/24* (2006.01)
*C22C 38/26* (2006.01)
*C22C 38/28* (2006.01)
*C22C 38/32* (2006.01)
*C22C 38/34* (2006.01)
*C22C 38/18* (2006.01)
*C21D 1/34* (2006.01)
*C21D 1/26* (2006.01)
*B32B 15/04* (2006.01)
*B32B 15/18* (2006.01)
*C23C 2/26* (2006.01)
*C23C 2/40* (2006.01)
*C23C 30/00* (2006.01)
*B23K 101/00* (2006.01)
*C23C 2/06* (2006.01)

(52) U.S. Cl.
CPC .............. *C22C 38/12* (2013.01); *C22C 38/14* (2013.01); *C22C 38/16* (2013.01); *C22C 38/18* (2013.01); *C22C 38/22* (2013.01); *C22C 38/24* (2013.01); *C22C 38/26* (2013.01); *C22C 38/28* (2013.01); *C22C 38/32* (2013.01); *C22C 38/34* (2013.01); *C22C 38/38* (2013.01); *C23C 2/12* (2013.01); *C23C 2/26* (2013.01); *C23C 2/40* (2013.01); *C23C 30/00* (2013.01); *C23C 30/005* (2013.01); *B23K 2101/006* (2018.08); *C21D 2211/001* (2013.01); *C21D 2211/004* (2013.01); *C21D 2211/008* (2013.01); *C23C 2/06* (2013.01); *Y10T 428/12757* (2015.01); *Y10T 428/12799* (2015.01); *Y10T 428/12972* (2015.01)

(56) References Cited

U.S. PATENT DOCUMENTS

| | | |
|---|---|---|
| 2010/0307644 A1 | 12/2010 | Gil Otin et al. |
| 2014/0230971 A1 | 8/2014 | Kawasaki et al. |
| 2014/0322559 A1 | 10/2014 | Becker et al. |
| 2017/0101695 A1 | 4/2017 | Arlazarov et al. |
| 2017/0321294 A1 | 11/2017 | Arlazarov et al. |
| 2018/0363084 A1* | 12/2018 | Lee .................. C22C 38/22 |
| 2019/0193187 A1 | 6/2019 | Perlade et al. |
| 2020/0347471 A1* | 11/2020 | Zhu .................. C21D 8/0473 |

FOREIGN PATENT DOCUMENTS

| | | |
|---|---|---|
| EA | 022435 B1 | 12/2015 |
| JP | WO2017026125 A1 | 2/2017 |
| KR | 1020140060574 A | 5/2014 |
| RU | 2437945 C2 | 12/2011 |
| RU | 2525013 C1 | 8/2014 |
| WO | WO2015177582 A1 | 11/2015 |
| WO | WO2017108897 A1 | 6/2017 |
| WO | WO2017108966 A1 | 6/2017 |
| WO | WO2017111524 A1 | 6/2017 |
| WO | WO2018055425 A1 | 3/2018 |

\* cited by examiner

COLD ROLLED AND ANNEALED STEEL SHEET AND METHOD OF MANUFACTURING THE SAME

The present invention relates to a high strength steel sheet having high ductility and formability and to a method to obtain such steel sheet.

BACKGROUND

To manufacture various items such as parts of body structural members and body panels for automotive vehicles, it is known to use sheets made of DP (Dual Phase) steels or TRIP (Transformation Induced Plasticity) steels.

SUMMARY OF THE INVENTION

To reduce the weight of the automotive in order to improve their fuel efficiency in view of the global environmental conservation, it is desirable to have sheets having improved yield and tensile strengths. But such sheets must also have a good ductility and a good formability and more specifically a good stretch flangeability.

It is an object of the present invention to provide a steel sheet reaching a yield strength of at least 750 MPa, a tensile strength of at least 1000 MPa, a uniform elongation of at least 12% and a hole expansion ratio of at least 20%.

The present invention provides a cold-rolled and heat-treated steel sheet, made of a steel having a composition comprising, by weight percent:
  C: 0.03-0.25%
  Mn: 3.5-8%
  Si: 0.5-2.0%
  Al: 0.03-2.0%
  Ti≤0.080%
  Nb≤0.080%
  V≤0.2%
  V+Ti+Nb>0.01%
  S≤0.010%
  P≤0.020%
  N≤0.008%
  and comprising optionally one or more of the following elements, in weight percentage:
  Mo: 0.1-0.5%
  Cr: 0.01-1%
  B: 0.0005-0.004%
  the remainder of the composition being iron and unavoidable impurities resulting from the smelting,
  said cold-rolled steel sheet having a microstructure consisting of, in surface fraction:
    between 10% and 30% of retained austenite, said retained austenite being present as films having an aspect ratio of at least 3 and as Martensite Austenite islands, less than 8% of such Martensite Austenite islands having a size above 0.5 µm,
    at most 1% of fresh martensite
    at most 50% of tempered martensite and
    recovered martensite containing precipitates of at least one element chosen among niobium, titanium and vanadium.

DETAILED DESCRIPTION

The invention will now be described in details and illustrated by examples without introducing limitations.

Hereinafter, Ae1 designates the equilibrium transformation temperature below which austenite is completely unstable, Ae3 designates the equilibrium transformation temperature above which austenite is completely stable, Ar3 designates the temperature until which the microstructure remains fully austenitic upon cooling, TΘ designates the temperature above which the cementite gets dissolved upon heating and Ms designates the martensite start temperature, i.e. the temperature at which the austenite begins to transform into martensite upon cooling.

All compositional percentages are given in weight percent (wt. %), unless indicated otherwise.

The composition of the steel according to the invention comprises, by weight percent:

$0.03\% \leq C \leq 0.25\%$ for ensuring a satisfactory strength and improving the stability of the retained austenite which is necessary to obtain a sufficient elongation. Preferably, the carbon content is higher than or equal to 0.1%. If the carbon content is too high, the hot rolled sheet is too hard to cold roll and the weldability is insufficient. If the carbon content is below 0.03%, the tensile strength will not reach the targeted values.

$3.5\% \leq Mn \leq 8\%$ for ensuring a satisfactory strength and achieving stabilization of at least part of the austenite, to obtain a sufficient elongation. Below 3.5%, the final structure comprises an insufficient retained austenite fraction, and an insufficient Mn content in the retained austenite, so that the desired combination of ductility and strength is not achieved. The maximum is defined to avoid having segregation issues which are detrimental for the ductility. Preferably, the manganese content is higher than or equal to 3.7%.

$0.5\% \leq Si \leq 2.0\%$ and $0.03\% \leq Al \leq 2.0\%$. According to the invention Si and Al together play an important role: silicon delays the precipitation of cementite upon cooling below the equilibrium transformation temperature Ae3. Therefore, a Si addition of at least 0.5% helps to stabilize a sufficient amount of retained austenite. Si further provides solid solution strengthening and retards the formation of carbides during carbon redistribution from martensite to austenite resulting from an immediate reheating and holding step performed after a partial martensitic transformation. At a too high content, silicon oxides form at the surface, which impairs the coatability of the steel. Therefore, the Si content is less than or equal to 2.0%.

Aluminum is a very effective element for deoxidizing the steel in the liquid phase during elaboration. In addition, Al is an alpha-former element that increases the Ae1 and Ae3 temperatures of the steel. Thus, owing to the addition of at least 0.03% of Al, the intercritical domain (i.e. between Ae1 and Ae3) is in a temperature range favoring the partitioning of Mn in the austenite, as described in further details below. The Al content is not higher than 2.0%, preferably not higher than 1.2%, in order to avoid the occurrence of inclusions, to avoid oxidation problems and to ensure the hardenability of the material.

The steel according to the invention must contain at least one element chosen among niobium, titanium and vanadium, in a minimum combined content of at least 0.01% Such addition will allow strengthening the recovered martensite by limiting the growth of martensitic laths through precipitation.

Nb≤0.080% can be added in order to refine the austenite grains during hot-rolling and to provide precipitation strengthening. In a preferred embodiment, the minimum amount of niobium added is 0.010%. Above 0.080% of addition, yield strength, elongation and hole expansion ratio are not secured at the desired level.

Ti≤0.080% can be added to provide precipitation strengthening. In a preferred embodiment, the minimum amount of titanium added is 0.010%. However, when its amount is above or equal to 0.080%, yield strength, elongation and hole expansion ratio are not secured at the desired level V≤0.2% can be added to provide precipitation strengthening. In a preferred embodiment, the minimum amount of vanadium added is 0.010%. However, when its amount is above or equal to 0.2%, yield strength, elongation and hole expansion ratio are not secured at the desired level.

The remainder of the composition of the steel is iron and impurities resulting from the smelting. In this respect, Ni, Cu, S, P and N at least are considered as residual elements which are unavoidable impurities. Therefore, their contents are less than 0.05% for Ni, 0.03% for Cu, 0.010% for S, 0.020% for P and 0.008% for N.

Some elements can optionally be added to the composition of the steel according to the invention:

0.1%≤Mo≤0.5%. Molybdenum increases the hardenability, stabilizes the retained austenite thus reducing austenite decomposition during partitioning, and reduces the central segregation which can result from the high manganese content and which is detrimental to the hole expansion ratio. Furthermore, Mo helps refining the structure. Above 0.5%, the addition of Mo is costly and ineffective in view of the properties which are sought after.

0.01%≤Cr≤1% to delay the dissolution of carbides and stabilize the retained austenite. A maximum of 1% of chromium is allowed, above a saturation effect is noted, and adding chromium is both useless and expensive.

0.0005%≤B≤0.004% in order to increase the quenchability of the steel.

Preferably, the composition of the steel is such that the steel has a carbon equivalent Ceq lower or equal to 0.4%, the carbon equivalent being defined as Ceq=C%+Si%/55+Cr%/20+Mn%/19−Al%/18+2.2*P%−3.24*B%−0.133*Mn%*Mo%.

The microstructure of the cold-rolled and heat-treated steel sheet according to the invention will be now described.

The cold-rolled and heat-treated steel sheet has a structure consisting of, in surface fraction:
between 10% and 30% of retained austenite, said retained austenite being present as films having an aspect ratio of at least 3 and as Martensite Austenite islands (so called MA islands), less than 8% of such MA islands having a size above 0.5 µm,
at most 1% of fresh martensite
at most 50% of tempered martensite and
recovered martensite containing precipitates of at least one element chosen among niobium, titanium and vanadium.

The surface fractions and aspect ratio are determined through the following method: a specimen is cut from the cold-rolled and heat-treated, polished and etched with a reagent known per se, so as to reveal the microstructure. The section is afterwards examined through optical or scanning electron microscope, for example with a Scanning Electron Microscope with a Field Emission Gun ("FEG-SEM") at a magnification greater than 5000×, coupled to an Electron Backscatter Diffraction ("EBSD") device and to a Transmission Electron Microscopy (TEM).

The determination of the surface fraction of each constituent are performed with image analysis through a method known per se. The retained austenite fraction is for example determined by X-ray diffraction (XRD).

The microstructure of the cold-rolled and heat-treated steel sheet includes at least 10% of austenite which is, at room temperature, retained austenite. When present in surface fraction of at least 10%, retained austenite contributes to increasing ductility. Above 30%, the required level of hole expansion ratio HER according to ISO 16630:2009 is lower than 20%.

The retained austenite is present as films having an aspect ratio of at least 3 and as MA (Martensite Austenite) islands, less than 8% of such MA islands having a size above 0.5 µm.

The specific minimum value of aspect ratio of the residual austenite films and the maximum percentage of MA islands having a size above 0.5 µm have to be respected to obtain the required level of hole expansion ratio HER according to ISO 16630:2009.

In a preferred embodiment, the cold-rolled and heat-treated steel sheet according to the invention is such that the fraction ratio between MA islands having a size above 0.5 µm and the austenite film is below 1.0 or, even better, below 0.5.

In another preferred embodiment, the cold-rolled and heat-treated steel sheet according to the invention is such that less than 5% of such MA islands have a size above 0.5 µm.

In another preferred embodiment, the cold-rolled and heat-treated steel sheet according to the invention is such that the surface fraction of austenite films having an aspect ratio above 3 is at least 5%.

The microstructure of the cold-rolled and heat-treated steel sheet includes at most 1% of fresh martensite and at most 50% of tempered martensite. Indeed, a fraction of tempered martensite higher than 50% would lead to a uniform elongation lower than 12%.

In another preferred embodiment, the cold-rolled and heat-treated steel sheet according to the invention is such that the surface fraction of fresh martensite is below 1%.

The microstructure of the cold-rolled and heat-treated steel sheet includes recovered martensite containing precipitates of at least one element chosen among niobium, titanium and vanadium. If such precipitates are not present, the steel grade can not reach the minimum value of tensile strength targeted by the invention.

Tempered martensite is the martensite formed upon cooling after the second annealing then tempered during the tempering step; recovered martensite is the martensite formed upon cooling after the first annealing then recovered during the second annealing.

Recovered martensite can be distinguished from tempered and fresh martensite on a section polished and etched with a reagent known per se, for example Nital reagent, observed by Scanning Electron Microscopy (SEM) and Electron Backscatter Diffraction (EBSD).

The steel sheet according to the invention can be produced by any appropriate manufacturing method and the man skilled in the art can define one. It is however preferred to use the method according to the invention comprising the following steps:

Hot rolled sheet having a thickness between, for example, 1.8 to 6 mm can be produced by casting a steel having a composition as mentioned above so as to obtain a slab, reheating the slab at a temperature $T_{reheat}$ comprised between 1150° C. and 1300° C., and hot rolling the reheated slab, the final rolling temperature being higher than Ar3, to obtain a hot rolled steel.

The final rolling temperature is preferably of at most 1000° C., in order to avoid coarsening of the austenitic grains.

The hot-rolled steel is then cooled, at a cooling rate for example comprised between 1° C./s and 120° C./s, and coiled at a temperature $T_{coil}$ comprised between 20° C. and 600° C.

After the coiling, the sheet can be pickled.

The hot-rolled steel sheet is then annealed, in order to improve the cold-rollability and the toughness of the hot-rolled steel sheet, and in order to provide a hot-rolled and annealed steel sheet which is suitable for producing a cold-rolled and heat-treated steel sheet having high mechanical properties, in particular a high strength and a high ductility.

In a preferred embodiment, the annealing performed on the hot-rolled steel sheet is a batch annealing, performed at a temperature comprised between 500° C. and 680° C., during 1000 s to 50000 s.

The hot-rolled and annealed steel sheet is then optionally pickled.

The hot-rolled and annealed steel sheet is then cold-rolled to obtain a cold rolled steel sheet having a thickness that can be, for example, between 0.7 mm and 3 mm, or even better in the range of 0.8 mm to 2 mm.

The cold-rolling reduction ratio is preferably comprised between 20% and 80%. Below 20%, the recrystallization during subsequent heat-treatment is not favored, which may impair the ductility of the cold-rolled and heat-treated steel sheet. Above 80%, there is a risk of edge cracking during cold-rolling.

The cold-rolled steel sheet is then heat treated on a continuous annealing line.

The heat treatment comprises the steps of:

reheating the cold-rolled steel sheet to a first annealing temperature between Ae3 and Ae3+100° C. and maintaining the cold-rolled steel sheet at said annealing temperature for a holding time comprised between 30 s and 600 s, so as to obtain, upon annealing, a fully austenitic structure, The reheating rate to the first annealing temperature is preferably comprised between 1° C./s and 200° C./s.

quenching the cold-rolled steel sheet at a cooling rate comprised between 0.5° C./s and 200° C./s, to a quenching temperature comprised between 20° C. and Ms-50° C. and maintaining it at said quenching temperature for a holding time comprised between 1 and 200 s, The cooling rate is chosen so as to avoid the formation of pearlite upon cooling. For each particular composition of the steel and each structure, one skilled in the art knows how to determine the Ms start transformation point of the austenite by dilatometry.

During this quenching step, the austenite partly transforms into martensite.

If the quenching temperature is lower than 20° C., the fraction of recovered martensite in the final structure is too high to stabilize a sufficient amount of retained austenite above 10%. Besides, if the quenching temperature is higher than Ms-50° C., the fraction of restored martensite in the final structure is too low to obtain the desired elongation.

optionally holding the quenched sheet at the quenching temperature for a holding time comprised between 2 s and 200 s, preferably between 3 s and 7 s, so as to avoid the formation of epsilon carbides in martensite, that would result in a decrease in the elongation of the steel.

reheating the cold-rolled steel sheet to a second annealing temperature comprised between TO and Ae3-30° C., and maintaining the cold-rolled steel sheet at said annealing temperature for a time comprised between 100 s and 2000 s, During this second annealing step, the cementite gets dissolved and the carbon and Mn diffuse from the martensite to the austenite, thereby achieving an enrichment in carbon and Mn of the austenite and recovering the martensite.

optionally hot-dip coating the sheet in a bath at a temperature lower than or equal to 480° C. Any kind of coatings can be used and in particular, zinc or zinc alloys, like zinc-nickel, zinc-magnesium or zinc-magnesium-aluminum alloys, aluminum or aluminum alloys, for example aluminum-silicon.

immediately after the second annealing step, or immediately after the hot-dip coating step, if performed, cooling the cold-rolled steel sheet to the room temperature, to obtain a cold-rolled and heat treated steel sheet. The cooling rate is preferably higher than 1° C./s, for example comprised between 2° C./s and 20° C./s.

During this cooling step, part of the austenite may transform into fresh martensite. However, the surface fraction of the fresh martensite remains lower than or equal to 50%.

after cooling down to the room temperature and optional coating, the sheet is subjected to an tempering treatment, at a temperature comprised between 170° C. and 500° C., for a holding time comprised between 3 and 1200 s (the higher the temperature, the lower the holding time). This tempering treatment is destined to reduce the proportion of big MA islands (with a size above 0.5 μm) that are turned into tempered martensite with austenite films having an aspect ratio of at least 3 or small austenite islands with a size less than 0.5 μm.

optionally, after cooling down to the room temperature, if the hot-dip coating step has not been performed, the sheet can be coated by electrochemical methods, for example electro-galvanizing, or through any vacuum coating process, like PVD or Jet Vapor Deposition. Any kind of coatings can be used and in particular, zinc or zinc alloys, like zinc-nickel, zinc-magnesium or zinc-magnesium-aluminum alloys. Optionally, after coating by electro-galvanizing, the sheet may be subjected to degassing.

EXAMPLES

Two grades, which compositions are gathered in table 1, were cast in semi-products and processed into steel sheets following the process parameters gathered in table 2, going through heating, controlled hot rolling and subsequent water cooling, achieved by quenching and self-tempering.

TABLE 1

Compositions
The tested compositions are gathered in the following table
wherein the element contents are expressed in weight percent:

| Steel | C | Mn | Si | Al | Ti | Nb | V | S | P | N | Ae1 | TΘ | Ae3 |
|---|---|---|---|---|---|---|---|---|---|---|---|---|---|
| A | 0.146 | 3.86 | 1.48 | 0.03 | — | 0.059 | — | 0.001 | 0.009 | 0.004 | 645 | 660 | 780 |
| B | 0.126 | 5.00 | 0.51 | 1.78 | — | 0.027 | — | 0.002 | 0.009 | 0.005 | 580 | 660 | 950 |

Steel A and B are according to the invention.

For a given steel, one skilled in the art knows how to determine Ae1, Ae3 and TΘ temperatures through dilatometry tests and metallography analysis.

TABLE 2

Process parameters
Steel semi-products, as cast, were reheated at 1250° C., hot rolled and then coiled at 550° C., pickled, annealed at 600° C. during 5 h, pickled and cold rolled with a 50% reduction rate. They were then processed under the following conditions:

| | | First annealing | | | | | | Second annealing | | Tempering | |
|---|---|---|---|---|---|---|---|---|---|---|---|
| | | Reheating | | Cooling | | | Holding time | | | | |
| Trial | Steel | rate (° C./s) | Temperature (° C.) | Time (s) | rate (° C./s) | Tquench (° C.) | at Tquench (s) | Temperature (° C.) | Time (s) | Temperature (° C.) | Time (s) |
| 1 | A | 10 | 820 | 120 | 5 | 50 | 3 | 700 | 180 | 450 | 300 |
| 2 | A | 10 | 820 | 120 | 5 | 50 | 3 | 740 | 180 | 450 | 300 |
| 3 | A | 10 | 820 | 120 | 5 | 210 | 3 | 690 | 150 | — | — |
| 4 | B | 15 | — | — | — | — | — | 730 | 500 | — | — |
| 5 | B | 15 | — | — | — | — | — | 740 | 500 | — | — |
| 6 | B | 15 | — | — | — | — | — | 750 | 500 | — | — |

The resulting samples were then analyzed and the corresponding microstructure elements and mechanical properties were respectively gathered in table 3 and 4.

TABLE 3

Microstructure and precipitates
The phase percentages of the microstructures of the obtained steel sheet were determined:

| Trial | γ (%) | γ aspect ratio | MA (%) | FM (%) | TM (%) | RM (%) | RF | Precipitates in RM? |
|---|---|---|---|---|---|---|---|---|
| 1* | 17 | 4 | 5 | 0 | 2 | 81 | 0 | Yes |
| 2* | 12 | 4 | 2 | 0 | 38 | 50 | 0 | Yes |
| 3 | 16 | 4 | 25 | 15 | 0 | 69 | 0 | Yes |
| 4 | 21 | 1.5 | 14 | 9 | 0 | 0 | 70 | Yes |
| 5 | 23 | 1.5 | 18 | 10 | 0 | 0 | 67 | Yes |
| 6 | 23 | 1.5 | 23 | 14 | 0 | 0 | 63 | Yes |

*trials according to the invention.
γ: stands for residual austenite surface fraction
γ aspect ratio: stands for the aspect ratio of austenite films
MA: stands for MA islands surface fraction with a size above 0.5 μm
FM: stands for fresh martensite surface fraction
TM: stands for tempered martensite
RM: stands for recovered martensite or recrystallized ferrite surface fraction
RF: stands for recrystallized ferrite surface fraction
Precipitates in RM: stands for presence of precipitates of Nb in recovered martensite

TABLE 4

Mechanical properties
Mechanical properties of the tested samples were determined and gathered in the following table:

| Trial | YS (MPa) | TS (MPa) | UE (%) | HER (%) |
|---|---|---|---|---|
| 1* | 815 | 1103 | 18.8 | 21.2 |
| 2* | 1037 | 1267 | 12.8 | 22.0 |
| 3 | 659 | 1183 | 14.3 | 15.8 |
| 4 | 861 | 1064 | 18.5 | 16.2 |
| 5 | 833 | 1086 | 17.2 | 14.2 |
| 6 | 786 | 1110 | 15.4 | 11.6 |

*trials according to the invention.

The yield strength YS, the tensile strength TS and the uniform elongation UE are measured according to ISO standard ISO 6892-1, published in October 2009. The hole expansion ratio HER is measured according to ISO standard 16630:2009. Due to differences in the methods of measure, the values of the hole expansion ratio HER according to the ISO standard 16630:2009 are very different and not comparable to the values of the hole expansion ratio λ according to the JFS T 1001 (Japan Iron and Steel Federation standard).

The examples show that the steel sheets according to the invention, namely examples 1 and 2 are the only one to show all the targeted properties thanks to their specific composition and microstructures.

What is claimed is:

1. A cold-rolled and heat-treated steel sheet, made of a steel having a composition comprising by weight percent:

C: 0.03-0.25%,
Mn: 3.5-8%,
Si: 0.5-2.0%,
Al: 0.03-2.0%,
Ti≤0.080%,
Nb≤0.080%,
V≤0.2%,
V+Ti+Nb>0.01%,
S≤0.010%,
P≤0.020%
N≤0.008%,
and optionally including at least one of the following elements, in weight percentage:
Mo: 0.1-0.5%,
Cr: 0.01-1%,
B: 0.0005-0.004%,
a remainder of the composition being iron and unavoidable impurities resulting from processing,
the cold-rolled and heat-treated steel sheet having a microstructure consisting of, in surface area fraction:
between 10% and 30% of retained austenite, the retained austenite being present as austenite films having an aspect ratio of at least 3 and as Martensite Austenite islands, less than 8% of the Martensite Austenite islands having a size above 0.5 μm,
at most 1% of fresh martensite,
at most 50% of tempered martensite, and
recovered martensite containing precipitates of at least one element chosen from the group consisting of: niobium, titanium and vanadium.

2. The cold-rolled and heat-treated steel sheet as recited in claim 1 wherein aluminium content is at most 1.2%.

3. The cold-rolled and heat-treated steel sheet as recited in claim 1 wherein niobium content is at least 0.010%.

4. The cold-rolled and heat-treated steel sheet as recited in claim 1 wherein carbon content is at least 0.10%.

5. The cold-rolled and heat-treated steel sheet as recited in claim 1 wherein a surface area fraction ratio between the Martensite Austenite islands having the size above 0.5 μm and the austenite films is below 1.0.

6. The cold-rolled and heat-treated steel sheet as recited in claim 5 wherein the surface area fraction ratio is below 0.5.

7. The cold-rolled and heat-treated steel sheet as recited in claim 1 wherein the surface area fraction of the fresh martensite is below 1%.

8. The cold-rolled and heat-treated steel sheet as recited in claim 1 wherein less than 5% of the Martensite Austenite islands have the size above 0.5 μm.

9. The cold-rolled and heat-treated steel sheet as recited in claim 1 wherein the surface area fraction of the austenite films having an aspect ratio above 3 is at least 5%.

10. The cold-rolled and heat-treated steel sheet as recited in claim 1 wherein the cold-rolled and heat-treated steel sheet is coated with Zn or a Zn alloy.

11. The cold-rolled and heat-treated steel sheet as recited in claim 1 wherein the cold-rolled and heat-treated steel sheet is coated with Al or a Al alloy.

12. The cold-rolled and heat-treated steel sheet as recited in claim 1 wherein the cold-rolled and heat-treated steel sheet has a yield strength YS of at least 750 MPa, a tensile strength TS of at least 1000 MPa, a uniform elongation UE of at least 12%, and a hole expansion ratio HER of at least 20%.

13. A method for manufacturing a cold-rolled and heat-treated steel sheet, comprising the following successive steps:

casting a steel so as to obtain a slab, the steel having a composition comprising by weight percent:
C: 0.03-0.25%,
Mn: 3.5-8%,
Si: 0.5-2.0%,
Al: 0.03-2.0%,
Ti≤0.080%,
Nb≤0.080%,
V≤0.2%,
V+Ti+Nb>0.01%,
S≤0.010%,
P≤0.020%,
N≤0.008%,
and optionally including at least one of the following elements, in weight percentage:
Mo: 0.1-0.5%,
Cr: 0.01-1%,
B: 0.0005-0.004%,
a remainder of the composition being iron and unavoidable impurities resulting from processing;
reheating the slab at a temperature $T_{reheat}$ between 1150° C. and 1300° C.;
hot rolling the reheated slab at a temperature higher than Ar3 to obtain a hot rolled steel sheet;
coiling the hot rolled steel sheet at a coiling temperature $T_{coil}$ between 20° C. and 600° C.;
annealing the hot rolled steel sheet, to obtain a hot-rolled and annealed steel sheet;
cold rolling the hot-rolled and annealed steel sheet so as to obtain a cold rolled steel sheet;
reheating the cold-rolled steel sheet to a first annealing temperature between Ae3 and Ae3+100° C. and maintaining the cold-rolled steel sheet at the first annealing temperature for a holding time between 30 s and 600 s, so as to obtain, upon annealing, a fully austenitic structure;
quenching the cold-rolled steel sheet at a cooling rate between 0.5° C./s and 200° C./s, to a quenching temperature between 20° C. and Ms-50° C. and maintaining the cold-rolled steel sheet at the quenching temperature for a holding time between 1 and 200 s;
reheating the cold-rolled steel sheet to a second annealing temperature comprised between TΘ and Ae3-30° C., TΘ designating the temperature above which the cementite is dissolved upon heating, and maintaining the cold-rolled steel sheet at the second annealing temperature for a time between 100 s and 2000 s;
cooling the cold-rolled steel sheet to the room temperature; and
tempering the cold-rolled steel sheet, at a temperature between 170° C. and 500° C., for a holding time between 3 and 1200 s to obtain a cold-rolled and heat treated steel sheet as recited in claim 1.

14. The method as recited in claim 13 wherein the annealing of the hot-rolled steel sheet is a batch annealing, performed at a temperature 500° C. and 680° C. for 1000 s to 50000 s.

15. The method as recited in claim 13 wherein the reheating rate of the cold rolled steel sheet to the first annealing temperature is between 1 and 200° C./s.

16. A method for producing a spot welded joint of at least two steel sheets, comprising the steps of:
providing the cold-rolled and heat-treated steel sheet manufactured according to the method as recited in claim 13;

providing a second steel sheet; and spot welding the cold-rolled and heat-treated steel sheet to the second steel sheet.

17. The method as recited in claim 16 wherein the second steel sheet is a cold-rolled and heat-treated steel sheet manufactured according to the method as recited in claim 13.

18. A method for producing a spot welded joint of at least two steel sheets, comprising the steps of:

providing the cold-rolled and heat-treated steel sheet as recited in claim 1;

providing a second steel sheet; and spot welding the cold-rolled and heat-treated steel sheet to the second steel sheet.

19. The method as recited in claim 18 wherein the second steel sheet is a cold-rolled and heat-treated steel sheet as recited in claim 1.

* * * * *